UNITED STATES PATENT OFFICE.

EMIL F. DIETERICHS, OF CLEVELAND, OHIO.

FODDER-BLOCK.

SPECIFICATION forming part of Letters Patent No. 355,257, dated December 28, 1886.

Application filed April 22, 1886. Serial No. 199,811. (No specimens.)

*To all whom it may concern:*

Be it known that I, EMIL F. DIETERICHS, a citizen of the United States, residing at Cleveland, in the county of Cuyahoga and State of Ohio, have invented a new and useful article of manufacture, which I denominate "Bread or Fodder Blocks," and of which the following is a correct specification.

This invention relates to a fodder cake or block intended as a food for live stock, composed of cereal refuse from flour-mills, glucose-works, breweries, distilleries, &c.

The object of the invention is to present such fodder in a clean, nutritive, and palatable form, and one convenient for handling, storage, and transportation.

I take cornmeal, barley-meal, rye-meal, wheat-shorts, wheat-middlings, and all like products of flour-mills used for animal food, which contain some glutinous properties, and moisten them slightly, either mixing them together or preserving them separate, as desired, and add salt and a small quantity of salicylic acid or other form of salicine. The moistened mass is formed into blocks or loaves, and may be slightly compressed. The blocks or loaves (which are preferably each about of a size to furnish one feed for a horse) are then dried or baked into compact blocks.

Wheat-bran, oat-bran, oat-dust, cornmeal, finely-chopped hay, &c., which do not possess glutinous properties, I intermix with some proportion of the above-mentioned cereal waste, or rough and cheap products of grinding.

A convenient mode of mixing the ingredients for the food-blocks is to add the salt and salicine to the water with which the mass is moistened—say one pound salt to five pounds water—and add one to five per cent. of salicylic acid, or its equivalent in other forms of salicine; but the proportions may be varied, accordingly as it is desired to preserve the fodder for a longer or shorter time, the salt and salicine both acting as preservative agents.

I claim—

A fodder brick or block composed of cereal waste and having a proportion of glutinous matter, and containing salt and salicine, substantially as described, and for the purpose set forth.

EMIL F. DIETERICHS.

Witnesses:
C. L. HOTZE,
HENRY L. WASHBURN.